Nov. 14, 1972 J. DECKER 3,702,716
ROUND GIB FOR MACHINE SLIDE
Filed Feb. 8, 1971
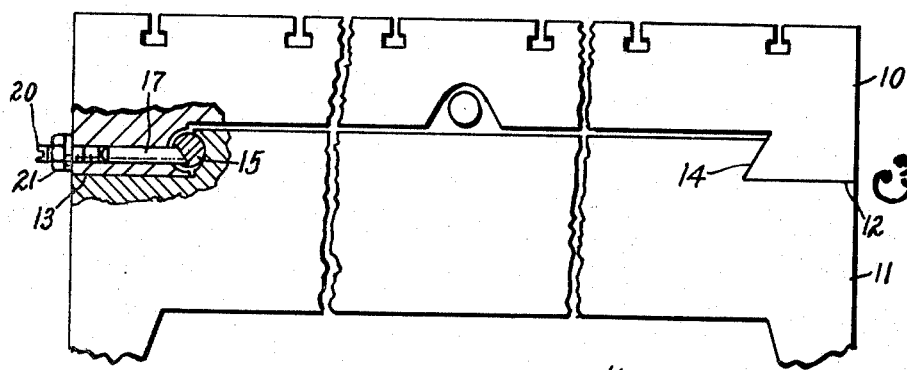
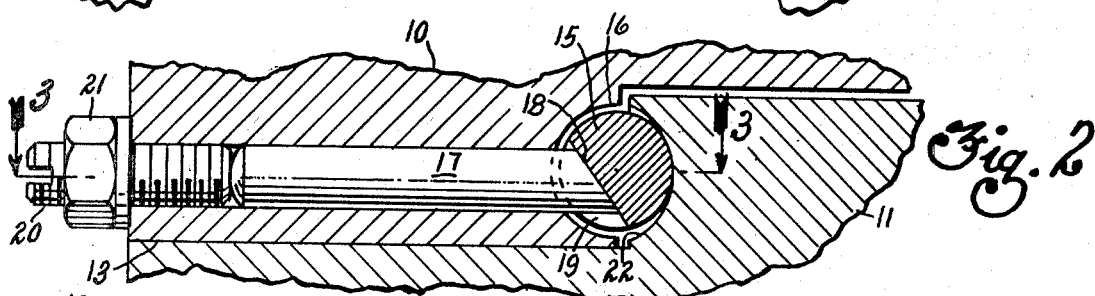
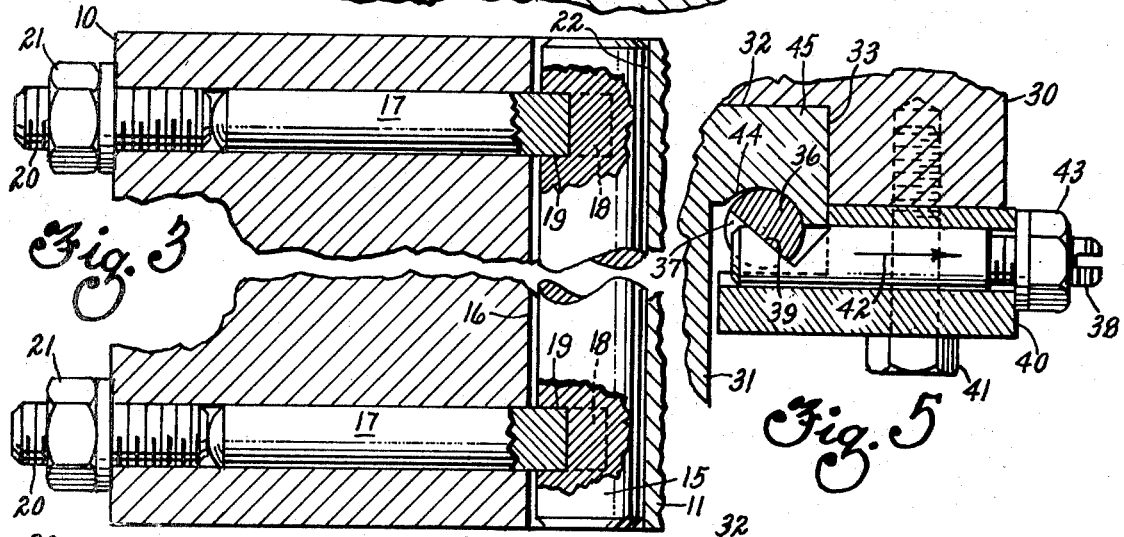
INVENTOR.
JACOB DECKER
BY Howard J. Keiser
& Alfred J. Mayer
ATTORNEYS _United States Patent Office_

3,702,716
Patented Nov. 14, 1972

3,702,716
ROUND GIB FOR MACHINE SLIDE
Jacob Decker, Cincinnati, Ohio, assignor to Cincinnati Milacron Inc., Cincinnati, Ohio
Filed Feb. 8, 1971, Ser. No. 113,168
Int. Cl. F16c *17/00*
U.S. Cl. 308—3 A                                 4 Claims

ABSTRACT OF THE DISCLOSURE

A round bar gib for insuring a perfect fit and taking up wear between a pair of relatively movable members such as a machine tool slide and the support therefor. The gib is formed from a round straight bar which may be centerless ground to a high degree of accuracy thereby providing a simple and inexpensive gib which requires no hand fitting. The round gib lends itself to a design in which any lost-motion between the slide and its support is taken up in two directions simultaneously. Also, the gib may be made of hardenable material and ground to final size after it has been hardened. Thereby, the wear and friction characteristics between the slide and its support are improved and better sliding action is achieved.

BACKGROUND OF THE INVENTION

To insure a proper sliding fit between a machine tool slide and its supporting guides or ways, it is a common practice to provide an adjusting strip, or gib in conjunction with each of the ways. The function of this strip is to prevent lateral movement of the slide and to compensate for wear. Where square ways are employed, it is necessary to guard against up and down, or lifting motion of the slide, as well as against sidewise motion. For this purpose, another strip or gib must be provided for taking up the lost-motion between the slide and the way in the vertical direction. Sometimes, the two strips or gibs are combined in the form of a right-angle strip. However, the combined form of strip may be impractical, as where tapered gibs are required or where space restrictions are severe.

Whatever type of gib is used, it must be accurately made and carefully fitted in order to function properly. The fitting operation, particularly in the case of tapered gibs, is a difficult one and requires many hours of tedious work by a skilled mechanic. Also, in the case of gibs which require hand scraping, it is not possible to use a hard material having desirable wear characteristics.

SUMMARY OF THE INVENTION

It is an object of the present invention to provide a gib system which requires a minimum of hand labor in its manufacture and assembly and, at the same time, provides an efficient and sturdy supporting structure for the slide. This is accomplished through the use of a round bar gib which may be formed of hardenable material and finish ground in a centerless grinder after hardening. Because of the high degree of accuracy which can be achieved by the grinding operation, it is possible with the new gib to obtain a much closer adjustment and a more rigid slide action than was possible with the prior art systems.

The surface against which the gib is adapted to bear may take the form of either a flat face or a portion of a cylinder depending on the gibbing system employed. This surface may be smoothly finished by any of the conventional machining methods such as, but not restricted to, planing or grinding. Where a cylindrical surface is employed, the radius of the cylinder is preferably made slightly larger than that of the bar so as to permit free sliding movement of the bar in the track.

Another feature of the invention resides in the adaptability of the round bar gib to a construction in which both sidewise and lifting movements of the slide may be prevented by adjustment of the bar in a single direction only. This insures that wear and lost-motion will be taken up in both directions simultaneously whenever an adjustment is made.

DESCRIPTION OF THE DRAWINGS

FIG. 1 is an end elevation of a machine tool slide and support with portions broken away to show the round bar gib as applied to a dovetail slide.

FIG. 2 is an enlarged view, in cross-section, of the gib system shown in FIG. 1.

FIG. 3 is a cross-sectional view taken along line 3—3 in FIG. 2.

FIG. 4 is a fragmentary end view of a machine tool slide and support with portions broken away to show an application of the round bar gib to a slide with square ways.

FIG. 5 is an enlarged view, in cross-section of one of the gib systems shown in FIG. 4.

FIG. 6 is a fragmentary end view of a machine tool slide and support showing a modified form of the invention in which the round bar gib bears against a flat face on the support.

FIG. 7 is an enlarged view, in cross-section, of one of the gib systems shown in FIG. 6.

In FIG. 1 is shown a machine tool slide 10 mounted for reciprocating movement on a support 11 by means of ways 12 and 13. In this instance, the invention is shown as applied to a dovetail slide, one of the dovetails 14 being retained and the other being replaced by a round bar gib system.

As best shown in FIG. 2, a round bar gib 15 is received in an arcuate groove 16 extending lengthwise of the slide 10. The gib is supported therein by a plurality of adjusting rods 17 received in bores provided therefor in the slide 10. Each of the rods 17 is provided at its inner end with an inclined face 18 which is adapted to engage against the bottom of a notch 19 cut into the side of the gib. As shown in FIG. 3, the notches 19 are formed at appropriate intervals along the length of the gib to receive the ends of the rods 17.

At their outer ends, the rods are engaged by adjustment screws 20 which thread into tapped portions the holes in which the rods 17 are received. Each screw is provided with a locknut 21 for holding it against rotation after it has been adjusted.

In the embodiment shown in FIGS. 1–3, inclusive, the gib engages against an arcuate surface or track 22 formed in the support 11 and extending parallel to the way 14. The track 22 may advantageously take the form of a portion of a cylinder having a radius somewhat greater than that of the gib 15 so as to permit the gib to slide freely on the surface of the track 22.

Because of the inclined face 18 formed on the inner end of each of the adjustment rods 17, the gib will be pressed against the upper portion of the track 22 when the screws 20 are turned to press the rods inwardly. Therefore, as the screws are tightened, not only will the dovetail 14 urge the right-hand side of the slide 10 into contact with the way 12, but also the downward reaction on the slide 10 provided by the gib 15 will cause the left-hand side of the slide to bear against the way 13. Thus, not only is sidewise play between the support and the slide taken up by adjustment of the gib, but also lifting action on the slide is prevented by reason of the downward thrust provided by the gib.

As mentioned earlier, the gib 15 is preferably formed of a hardenable material such as a high carbon steel or a suitable alloy in order to provide improved wear and friction characteristics between the gib and its mating groove or track. The support 11 will normally be made of a softer material such as cast iron or nodular iron and thereby the desirable coaction of a hard material against a softer one will be achieved.

Since the gib is made in the form of a round bar, it may be readily ground in its hardened state in a centerless grinder. The degree of accuracy to which it can thus be ground is of a high order. For example, in the present state of the art, it is perfectly feasible to grind the gib parallel and round to within .0005 inch. The track 22 may be machined to its arcuate form by any conventional method, such as planing or grinding and, since the radius thereof is somewhat larger than that of the rod, the roundness of the track is not critical. The principal requirement is that the track be smooth, straight and parallel to the dovetail 14. Since this can readily be achieved by present day machining methods, it is possible to provide an accurate and uniform fit of the gib to the track.

In FIGS. 4 and 5 there is shown a modified form of the invention in which the round bar gib is applied to a slide provided with square ways. In this embodiment, a slide 30 is mounted for sliding movement on a support 31 by means of the ways 32, 33 and 34. The corresponding surfaces on the slide 30 are held in contact with the ways by means of round bar gibs 35 and 36. The gib 35 is similar in all respects to the gib 15 previously described in connection with FIGS. 1, 2 and 3 and therefore requires no further description. The gib 36 is in effect a hold-down gib and is shown in greater detail in FIG. 5. This gib is provided at intervals along its length with notches 37 for receiving the inner ends of adjustment rods 38. Each of the rods 38 is provided with an inclined face 39 adapted to engage against the bottom of its associated notch 37 in the gib. The rods 38 are received and guided in bores provided in a bar 40 which is secured to the under edge of the slide by bolts 41. Thus, when the rods 38 are drawn outwardly, as indicated by the arrow 42, by tightening nuts 43, the gib 36 will be urged upwardly and toward the right against the surface of an arcuate groove or track 44 extending along the underside of a rail 45 on the support 31. This will cause the slide 30 to be urged downwardly and toward the left thereby maintaining the slide surfaces in contact with the ways 32 and 33. In a like manner, the gib 35, when tightened, will cause the slide to be moved downwardly and toward the left thereby maintaining the slide in contact with the way 34. The gibs 35 and 36 are preferably constructed of a hardenable material and centerless ground to the desired size. Hence, a rigid and long wearing gib system will be provided by the arrangement shown in FIGS. 4 and 5. Additionally, the adjustment of the gibs is simplified by simultaneous take up of lost-motion in both horizontal and vertical directions.

In FIGS. 6 and 7 is shown still another embodiment of the invention in which a slide 50 is mounted for sliding movement on a support 51 by means of ways 52 and 53 thereon which mate with corresponding surfaces on the slide 50. Lost-motion between the slide and its support normal to the direction of slide movement is controlled by adjustment of gibs 54 and 55. The gib systems 54 and 55 are similar in all respects and, therefore, only the gib 55 and its related structure will be described in detail. Referring to FIG. 7, the gib 55 is supported on the inclined ends of a plurality of adjustment rods 56 (only one shown). These rods are spaced along the length of the gib, as in the case of the previous systems, and engage in notches 57 provided in the gib at corresponding intervals. Each rod is provided with an adjustment screw 58 and the inclined ends of the rods urge the gib upward and toward the right, as viewed in FIG. 7, when the screws are tightened. In so doing, the gib is urged against a flat, inclined face 60 formed on the support 51. Another inclined face 61 extending lengthwise along the slide 50 serves as a reaction surface for the gib when it is urged into contact with the face 60 by the rods 56. The angle formed by the inclined ends of the rods 56 and the face 60 is indicated by reference numeral 62 and must be greater than the limiting angle of friction for the materials involved which, in this case, is approximately 6 degrees. Hence, when the rods 56 are adjusted inwardly by screws 58, the gib 55 will be urged upwardly and to the right so as to urge the slide down against the way 53. At the same time, the slide will be moved toward the left, as viewed in FIG. 7, so as to produce a corresponding action by the gib 54 and maintain the way 52 in contact with the slide. Also, any lost-motion in the sidewise direction will be eliminated by the adjustment of the gib 55.

Thus, it will be seen that by virtue of the round gib construction, it is possible to provide a gib arrangement which is rugged, sturdy and inexpensive to build. Also, adjustments of the gibs are facilitated by the simultaneous take-up in two directions instead of requiring two separate adjustments for this purpose.

What is claimed is:

1. A gib system for insuring a proper fit and taking up wear between a pair of relatively movable slide members such as a machine tool slide and its associated support, said system including a plurality of flat, parallel ways on said members for supporting said members for rectilinear sliding movement therebetween, a track on one of said members having its longitudinal axis extending parallel to said ways, a round bar gib disposed between said members and cooperating with said track, and adjustment means on the other of said members for displacing the gib literally into engagement with said track so as to prevent side-wise movement between said members while permitting free sliding movement therebetween along said ways, said adjustment means including a flat face on said gib disposed parallel to the longitudinal axis thereof, a thrust rod supported for longitudinal movement in a direction normal to the axis of said gib, and a flat pressure face on said rod inclined to its direction of movement and to the flat surfaces of said ways, said pressure face cooperating with the flat face on said gib to press the gib against the track in a direction such as to urge the ways into contact and prevent separation therebetween.

2. The gib system of claim 1 wherein said track is arcuate in cross-section and has a radius which is slightly larger than the radius of said gib.

3. The gib system of claim 1 wherein said gib is parallel and round to within .0005 inch.

4. The gib system of claim 1 wherein said track includes a flat surface on said one member which is inclined to the parting plane between said members, and wherein said adjusting means includes a thrust member acting on said gib in a direction inclined to said flat surface at an angle of at least 6 degrees.

References Cited

UNITED STATES PATENTS

| 2,340,450 | 2/1944 | Boushor | 308—3 A |
| 1,673,163 | 6/1928 | Schmelzkopf | 308—3 A |
| 2,654,640 | 10/1953 | Bullard | 308—3 A |
| 2,185,630 | 1/1940 | Fridlund | 308—3 A |

FOREIGN PATENTS

| 884,788 | 5/1943 | France | 308—4 A |
| 845,885 | 8/1952 | Germany | 308—3 A |

MILTON KAUFMAN, Primary Examiner

R. H. LAZARUS, Assistant Examiner

U.S. Cl. X.R.

308—4 R

UNITED STATES PATENT OFFICE
CERTIFICATE OF CORRECTION

Patent No. 3,702,716          Dated November 14, 1972

Inventor(s) Jacob Decker

It is certified that error appears in the above-identified patent and that said Letters Patent are hereby corrected as shown below:

Column 4, line 32, "literally" should read -- laterally -- .

Signed and sealed this 8th day of May 1973.

(SEAL)
Attest:

EDWARD M. FLETCHER, JR.          ROBERT GOTTSCHALK
Attesting Officer                Commissioner of Patents